United States Patent
Miles et al.

(10) Patent No.: US 12,207,787 B2
(45) Date of Patent: Jan. 28, 2025

(54) DEBRIS SIGNATURE-BASED ROBOTIC CLEANING DEVICE NAVIGATION

(71) Applicant: KYNDRYL, INC., New York, NY (US)

(72) Inventors: Caleb Miles, Columbia, MO (US); Shikhar Kwatra, San Jose, CA (US); Vijay Ekambaram, Chennai (IN); Padmanabha Venkatagiri Seshadri, Mysore (IN)

(73) Assignee: Kyndryl, Inc., New York, NY (US)

( * ) Notice: Subject to any disclaimer, the term of this patent is extended or adjusted under 35 U.S.C. 154(b) by 102 days.

(21) Appl. No.: 17/645,488

(22) Filed: Dec. 22, 2021

(65) Prior Publication Data

US 2023/0190061 A1 Jun. 22, 2023

(51) Int. Cl.
*A47L 9/28* (2006.01)
*G05D 1/00* (2024.01)

(52) U.S. Cl.
CPC ........... *A47L 9/2842* (2013.01); *A47L 9/2815* (2013.01); *A47L 9/2852* (2013.01); *G05D 1/0212* (2013.01); *A47L 2201/04* (2013.01); *A47L 2201/06* (2013.01)

(58) Field of Classification Search
CPC .............. A47L 2201/04; A47L 2201/06; A47L 9/2842; A47L 9/281; A47L 9/2815
See application file for complete search history.

(56) References Cited

U.S. PATENT DOCUMENTS

| 9,131,818 | B2* | 9/2015 | Peace | A47L 9/1633 |
| 10,918,252 | B2* | 2/2021 | Suvarna | A47L 11/4011 |
| 2004/0074038 | A1 | 4/2004 | Im et al. | |
| 2005/0162119 | A1* | 7/2005 | Landry | A47L 9/0488 |
| | | | | 318/580 |

(Continued)

FOREIGN PATENT DOCUMENTS

| CN | 100515302 C | * | 7/2009 | |
| CN | 105072966 A | * | 11/2015 | ........... A47L 9/2805 |

(Continued)

OTHER PUBLICATIONS

Translation of KR20030083970A (Year: 2024).*

(Continued)

*Primary Examiner* — Edward F Landrum
*Assistant Examiner* — Sarah Akyaa Fordjour
(74) *Attorney, Agent, or Firm* — CANTOR COLBURN LLP; Erik Swanson (57) ABSTRACT

Debris signature-based robotic cleaning device navigation includes operating the robotic cleaning device in a first mode as part of a vacuum cycle, the device including suction ports configurable for different suction power levels and each port having a suction path along which debris entering through the suction port is collected by the device. In the first operating mode the suction ports are operated at a first suction power level. The navigation also includes changing operation of the device to a second mode and in which the suction ports are operated at a greater suction power, measuring a respective amount of debris collected through each (Continued)

suction port, and selecting a direction in which to navigate the robotic cleaning device based on the debris measurements.

18 Claims, 6 Drawing Sheets

(56) References Cited

U.S. PATENT DOCUMENTS

| | | | |
|---|---|---|---|
| 2017/0231448 A1* | 8/2017 | Hong | A47L 9/02 15/319 |
| 2019/0029486 A1* | 1/2019 | Suvarna | A47L 9/2857 |
| 2020/0100640 A1 | 4/2020 | Marutani et al. | |
| 2020/0178747 A1 | 6/2020 | Scholten et al. | |
| 2021/0030225 A1 | 2/2021 | Broz et al. | |

FOREIGN PATENT DOCUMENTS

| | | | | |
|---|---|---|---|---|
| CN | 107272708 B | | 11/2020 | |
| EP | 1676517 B1 | * | 10/2011 | ........... A47L 9/1625 |
| KR | 20030083970 A | * | 11/2003 | |
| WO | WO2000007492 A1 | | 2/2000 | |
| WO | WO-2020122541 A1 | * | 6/2020 | .......... A47L 11/4011 |
| WO | WO-2020126320 A1 | * | 6/2020 | ......... B23Q 11/0071 |

OTHER PUBLICATIONS

Mell, Peter, et al., "The NIST Definition of Cloud Computing", NIST Special Publication 800-145, Sep. 2011, Gaithersburg, MD, 7 pgs.

* cited by examiner

FIG. 7

DEBRIS SIGNATURE-BASED ROBOTIC CLEANING DEVICE NAVIGATION

BACKGROUND

Aspects relate to the field of autonomous robotic devices, and more specifically robotic cleaning devices for cleaning surfaces, such as floors, by navigating along the surfaces and cleaning them. Robotic cleaning devices often navigate autonomously after being activated manually by a user or automatically, for instance on a set schedule to provide automatic cleaning. A popular type of robotic cleaning device is a robotic vacuum that vacuums debris from surfaces, though some robotic cleaning devices, including some robotic vacuums, incorporate additional cleaning capabilities such as the ability to wet-mop a surface.

SUMMARY

Shortcomings of the prior art are overcome and additional advantages are provided through the provision of a computer-implemented method. The method includes operating a robotic cleaning device in a first operating mode as part of a vacuum cycle. The robotic cleaning device includes suction ports configurable for different suction power levels. Each such suction port has a respective suction path along which debris entering through the suction port is collected by the robotic cleaning device. The first operating mode includes operating the plurality of suction ports at a first suction power level. The method also includes automatically changing operation of the robotic cleaning device to a second operating mode and operating the robotic cleaning device in the second operating mode as part of the vacuum cycle. The second operating mode includes operating the suction ports at a second suction power level that is greater than the first suction power level. The method measures, using one or more debris sensors, a respective amount of debris collected through each suction port of the suction ports. The measuring provides debris measurements, and the method additionally includes selecting a direction in which to navigate the robotic cleaning device based on the debris measurements.

Further, a system is provided that includes a memory and a processor in communication with the memory, where the computer system is configured to perform a method. The method includes operating a robotic cleaning device in a first operating mode as part of a vacuum cycle. The robotic cleaning device includes suction ports configurable for different suction power levels. Each such suction port has a respective suction path along which debris entering through the suction port is collected by the robotic cleaning device. The first operating mode includes operating the plurality of suction ports at a first suction power level. The method also includes automatically changing operation of the robotic cleaning device to a second operating mode and operating the robotic cleaning device in the second operating mode as part of the vacuum cycle. The second operating mode includes operating the suction ports at a second suction power level that is greater than the first suction power level. The method measures, using one or more debris sensors, a respective amount of debris collected through each suction port of the suction ports. The measuring provides debris measurements, and the method additionally includes selecting a direction in which to navigate the robotic cleaning device based on the debris measurements.

Yet further, a computer program product including a computer readable storage medium readable by a processing circuit and storing instructions for execution by the processing circuit is provided for performing a method. The method includes operating a robotic cleaning device in a first operating mode as part of a vacuum cycle. The robotic cleaning device includes suction ports configurable for different suction power levels. Each such suction port has a respective suction path along which debris entering through the suction port is collected by the robotic cleaning device. The first operating mode includes operating the plurality of suction ports at a first suction power level. The method also includes automatically changing operation of the robotic cleaning device to a second operating mode and operating the robotic cleaning device in the second operating mode as part of the vacuum cycle. The second operating mode includes operating the suction ports at a second suction power level that is greater than the first suction power level. The method measures, using one or more debris sensors, a respective amount of debris collected through each suction port of the suction ports. The measuring provides debris measurements, and the method additionally includes selecting a direction in which to navigate the robotic cleaning device based on the debris measurements.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the disclosure are apparent from the following detailed description taken in conjunction with the accompanying drawings in which:

DETAILED DESCRIPTION

Described herein are approaches for robotic cleaning device design and operation, including operation of the robotic cleaning device. Aspects and examples are presented by way of example using robotic vacuums but are not so limited and apply more broadly to any robotic cleaning devices.

Figure 1:
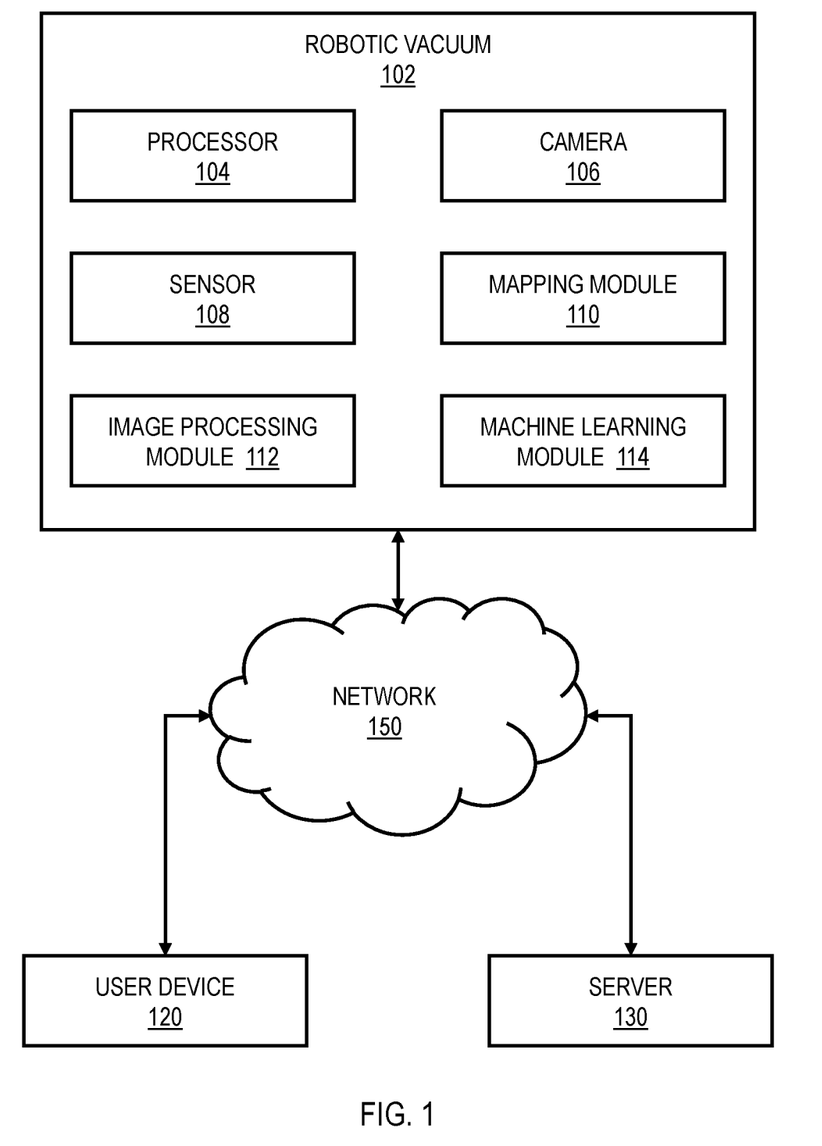
FIG. 1 depicts components of an example robotic cleaning device.

With reference to FIG. 1, shown is a block diagram of a robotic cleaning system 100 that includes a robotic cleaning device 102 communicatively coupled over wired/wireless communication link(s) 103 to user device 120 and server 130 via network 150. By way of specific example, the robotic cleaning system 100 may be a robotic vacuuming system and the robotic cleaning device 102 may be a robotic vacuum, and are referred to as such in the description of FIG. 1.

Robotic vacuum 102, user device 120, and server 130 may each be any type of computer system, such as is described herein. User device 120 may be any type of computer system (e.g., smartphone, tablet, computer, smartwatch, etc.) configured to communicate with the robotic vacuum 102 in any desired manner and for any desired purpose, such as to receive notifications from robotic vacuum 102. Server 130 may be any type of computer system configured to communicate with the robotic vacuum 102 in any desired manner and for any desired purpose, such as to automatically control/direct operation of the robotic vacuum, for instance to direction operation of the vacuum in any of various operating modes.

Network 150 may be any type of communication network, such as a wireless network or a cloud computing network. Network 150 may be substantially similar to, or the same as, cloud computing environment 50 described elsewhere herein. In some embodiments, the network 150 can be implemented using any number of any suitable communications media. For example, the network may be a wide area network (WAN), a local area network (LAN), an internet, or an intranet. In certain embodiments, the various systems may be local to each other, and communicate via any appropriate local communication medium.

For example, robotic vacuum 102 may communicate with user device 120 and/or server 130 using a WAN, one or more hardwire connections (e.g., an Ethernet cable) and/or wireless communication networks (e.g., wireless router). In some embodiments, the various systems may be communicatively coupled using a combination of one or more networks and/or one or more local connections. For example, robotic vacuum 102 may communicate with server 130 using a hardwired connection via a docking/charging station (not shown), while communication between the robotic vacuum 102 and user device 120 may be through a wireless communication network.

In the illustrated embodiment of FIG. 1, robotic vacuum 102 includes processor 104, camera 106, sensor 108, mapping module 110, image processing module 112, and machine learning module 114. In embodiments, camera 106 is communicatively coupled to the robotic vacuum 102 and configured to capture image data of the environment during each cleaning cycle. For example, camera 106 may capture image data showing various types of dirt or debris located on the floor within an environment. In other embodiments, camera 106 may be an Internet of Things (IoT) camera positioned at a location within the environment that can send image data to robotic vacuum 102. In embodiments, image processing module 112 is configured to analyze the image data generated from camera 106 to determine what type of dirt or debris is present in the environment. For example, image processing module 112 may identify through image analysis (e.g., pattern recognition, feature extraction, classification, etc.) that an area on the floor contains mold, liquid, dust, or pollen, as examples.

In embodiments, sensor 108 may be one or more sensors (e.g., liquid sensor, moisture sensor, gas sensor, air quality sensor, debris sensor, etc.) configured to identify the environmental condition relative to the environment. For example, sensor 108 may be a liquid sensor disposed on the robotic vacuum configured to determine if one or more substances (e.g., water) are present in an area within the environment. In other embodiments, sensor 108 may be a debris sensor configured to determine an amount/weight of debris collected from an area within the environment. For example, the debris sensor may be an optical sensor using a light emitter and detector to determine the amount of debris passing through the robotic vacuum during the cleaning cycle. In this way, the robotic vacuum may utilize the sensors to identify various amounts of dirt or debris located at specific areas throughout the environment and make recommendations to the user to improve the cleanliness of the environment.

In embodiments, sensor 108 may be configured as a proximity sensor that aids the robotic vacuum 102 in avoiding certain substances when detected (e.g., sticky substances). This prevents the robotic vacuum 102 from traveling over and/or vacuuming up the substance. When a substance to be avoided is detected, the system may identify the substance and recommend to the user to clean the identified area.

In embodiments, mapping module 110 is configured to generate a virtual map of the environment during each cleaning cycle. The mapping module 110 may identify the location of detected dirt and/or debris (e.g., determined by image analysis and/or sensors) relative to various rooms and/or landmarks within the environment during a cleaning cycle. Over time, the virtual map of the environment may change based on the cleanliness data collected during each cleaning cycle. For example, an area (e.g., room where a pet sleeps) may be identified as having excessive pet hair or a buildup of pet hair over time based on trends in the cleanliness data. The robotic vacuum 102 may use this data trend to make a recommendation to have the pet groomed or in some circumstances schedule a veterinarian appointment depending on the amount of pet hair detected.

In embodiments, when dirt/debris is detected within an area in the environment, the robotic vacuum 102 may send the recommendation to user device 120 prompting the user to take action. The recommendation may be in any form (e.g., text message, video, audio). For example, the robotic vacuum 102 may send an image of a wet spot on the floor along with the recommendation to inspect the area for water leaks. In embodiments, the recommendation may be received in a software application installed on user device 120. In embodiments, the user may set operation settings of the robotic vacuum 102 using the software application. In other embodiments, the robotic vacuum 102 may be controlled via settings accessible on a user interface disposed on the robotic vacuum. In embodiments, the robotic vacuum 102 may include a user interface that displays the recommendation to the user. In embodiments, the robotic vacuum 102 may store user profile information for one or more users.

In embodiments, the user profile information may be stored on robotic vacuum 102, user device 120, and/or server 130. The user profile may include various preferences for generating recommendations relative to the cleanliness data/trends. For example, the user profile may include default or manually adjusted thresholds and/or sensitivity levels for notifying the user of a cleanliness trend. For example, a first user may prefer to be notified when pollen is detected in an area within the environment because the first user may have a pollen allergy, while a second user may not want to be notified since the second user does not have a similar allergy. In this way, the recommendation settings may be unique for each user. In embodiments, the robotic vacuum 102 may determine which user to notify based on image recognition of the specific user (e.g., when using the user interface on the robotic vacuum to display the recommendation) or by sending the recommendation to a specific user device associated with the user.

In embodiments, machine learning module 114 may comprise various machine learning engines (artificial neural network, correlation engines, reinforcement feedback learning model, supervised/unsupervised learning model, etc.) configured to analyze scanning/cleanliness data generated from the robotic vacuuming system 100 to improve predictions for sending recommendations to the user. For example, the machine learning module 114 may utilize a feedback learning model to collect user preferences and user actions in response to receiving recommendations to reinforce the supervised and/or unsupervised models. Over time, the robotic vacuum 102 can become more accurate in properly adjusting the sensitivity for generating recommendations according to the user's preferences. For example, the robotic vacuum may detect moisture coming from a window in the user's home and recommend that the user inspect the window for leaks. Based on reoccurring scanning data subsequent to sending the recommendation, the robotic device may continue to detect the moisture. Over time the machine learning module 114 may determine the user has not taken any action to rectify the leak and therefore may lower the sensitivity for generating the recommendation relative to the detected moisture data. In this way, the machine learning module may learn from the user's actions (or inaction) to determine preferences for receiving recommendations.

In embodiments, the machine learning module 114 may determine, by analyzing the current cleanliness data, that the user has performed an action that has improved the environmental condition of the environment. For example, the cleanliness data may indicate dirt is no longer being detected near the air ducts in the home, which may indicate the user has replaced the air filter in the HVAC system. Once the machine learning module 114 determines the user has taken a corrective action to address an environmental condition, the robotic vacuum may disregard cleanliness data (e.g., relative to the dirty air ducts) that was collected prior to the user performing the corrective action from consideration for determine subsequent cleanliness trends. In this way, the robotic vacuum will start fresh with new cleanliness data for determining trends once a user action is performed that addresses the environmental condition (e.g., mopping up a water leak, cleaning mold, cleaning air ducts, etc.)

In embodiments, machine learning module 114 may be configured to learn from other robotic vacuums that may be communicatively coupled to server 130. For example, machine learning module 114 may analyze data from other robotic vacuums to determine proper sensitivity settings based on one or more other users (e.g., crowdsourcing). For example, machine learning module 114 may receive data from other robotic vacuums indicating one or more environmental conditions are occurring in one or more environments within a specific region. Based on the data received the robotic vacuum 102 may send a recommendation relative to rectifying the environmental condition. For example, multiple robotic vacuums may detect a gas leak occurring in multiple homes within a neighborhood. Machine learning module 114 may analyze this information and correlate the location of robotic vacuum 102 to determine if the robotic vacuum is in the affected region. If determined to be in the affected region, robotic vacuum 102 may recommend to the user to check for the gas leak and/or to avoid occupying the home.

FIG. 1 is intended to depict some representative components of a robotic vacuuming system 100. In some embodiments, however, individual components may have greater or lesser complexity than as represented in FIG. 1, components other than or in addition to those shown in FIG. 1 may be present, and the number, type, and configuration of such components may vary. Likewise, one or more components shown with the robotic vacuuming system 100 may not be present, and the arrangement of components may vary. In examples, no mapping module is present, for example. While FIG. 1 illustrates an example robotic vacuuming system 100 having a single robotic vacuum 102, a single user device 120, and a single server 130, suitable network architectures for implementing embodiments discussed herein may include any number of robotic vacuums, user devices, and/or servers. The various models, modules, systems, and components illustrated in FIG. 1 may exist, if at all, across a plurality of robotic vacuums, user devices, base stations, and servers.

Robotic vacuums typically come in two variants in terms of their navigation: (i) those that navigate randomly (e.g. by a random walk), and (ii) those with indoor localization capability. A vacuum cycle refers to a duration of time the vacuum spends vacuuming before halting, for instance to recharge or on the basis that the area to be cleaned has been covered. In examples, the vacuum cycle begins when the robotic begins vacuuming automatically or manually (typically from a common starting location, such as the vacuum's 'dock') and extends until the time the vacuum returns to its dock, for instance because it completed its tasks of vacuuming to area or because it requires further charge before resuming. The duration of the vacuum cycle can vary based on battery life and other factors.

Robot vacuums that perform a random walk do not track where they have been in the area during a vacuum cycle. Instead, they navigate more or less randomly in an area for a set duration of time or until the battery runs low, and then return to a charging dock. These types of robotic vacuums are usually less complex and more cost effective because they do not require sophisticated navigation or localization technology. However, their vacuum cycle typically takes longer in comparison to more intelligent robotic vacuums that navigate in part based on self-documented knowledge about what areas they have already covered, because it is likely that a random-walk vacuum will go over the same location possibly many times due to its random navigation.

Robotic vacuums with indoor localization capability track where they have been so that they know what areas were not covered. Typically they scan the environment as part of the cleaning/vacuum cycle and the data collected may include the spatial layout of the environment, among other characteristics. These robotic vacuums may determine the layout of furniture and where various landmarks (e.g., air ducts, windows, kitchen sinks, etc.) are located. This information may be analyzed to improve cleaning patterns of the robotic vacuum. While this provides intelligent and faster cleaning, as it can avoid covering the same location multiple times, these types of robotic vacuums tend to be costlier due to the additional sensors and (usually) incorporated infrared technology.

In accordance with some aspects described herein, collected debris amounts are used as signatures to approximately trace past movement of the robotic vacuum, providing a simple, cost-effective way of approximated location tracking without the use of more sophisticated localization technology.

In accordance with a particular embodiment, a robotic cleaning device, such as a robotic vacuum, is provided with a plurality of individual suction ports/pumps (e.g. 8) arranged at different locations of the robotic vacuum. The suction ports provide inward (toward the robotic vacuum)

suction from a corresponding plurality of different directions. Each suction port has a respective suction path along which debris enters through the suction port and is collected by the robotic vacuum. Each suction port can absorb dust and other debris, and the suction power through each port (correlating to the reach/distance of the suction and therefore the collection distance from the vacuum) can be programmatically controlled—increased/decreased—by adjusting the suction speed/force to control a suction power level. The vacuum can by default operate in a first operating mode in which the suction power level is relatively low in order to conserve power and provide better overall cleaning, e.g. by covering the entire surface area at relatively low suction power, rather than covering only selective areas at relatively high suction power due to demand on the battery.

In accordance with aspects described herein, operation of the robotic vacuum is controlled to provide a better approach to cleaning the area. By default, the robotic vacuum operates in a first operating mode as part of a vacuum cycle. The first operating mode operates the suction ports at a first suction power level. In this mode, the robotic vacuum navigates in a random-walk without tracking the prior movement or location of the robotic vacuum during the vacuum cycle. Periodically or aperiodically, the robotic vacuum automatically changes operation into a second operating mode. For instance, this might occur every k number of seconds, k>1. The timeframes during which the vacuum remains in the first operating mode before switching to the second operating mode, and vice versa, can vary depending on the context and circumstances in which the vacuum cycle occurs. The context and circumstances could account for any parameters, for instance the amount of debris collected, the location of the robotic cleaning device in the environment, the time since last vacuum cycle, and other factors. The robotic vacuum operates in the second operating mode for some amount of time before returning back to the first operating mode.

In the second operating mode, the suction ports operate at a second suction level that is greater than the first suction level. In other words, the robotic vacuum increases the suction power of the suction ports that intake debris from different directions. The vacuum then measures, using debris sensor(s), a respective amount of debris collected through each suction port of the suction ports. In examples, the amount measured is the amount collected from operating in that second operating mode after having switched operation from the first operating mode, i.e. does not encompass debris collected in the first operating mode. In examples, the vacuum operates in the second operating mode for a defined amount of time, for instance 10 seconds. During that time, the robotic vacuum may or may not move. The robotic vacuum then determines which direction to go next based on the suction path direction of the suction port that gathered the most debris, as reflected by the measurements taken. Thus, a process selects a direction in which to navigate the robotic vacuum based on the debris measurements, where the selected direction is a direction corresponding to the suction path of the suction port through which the greatest amount of debris was gathered as measured. Then, the process navigates the robotic vacuum in the selected direction and at some point, for instance after traveling a predefined distance or for a predefined amount of time, changes the operation of the robotic vacuum from the second operating mode back to the first operating mode.

Switching into the second operating mode from the first operating mode, and then back to the first operating mode, can be iterated one or more times during a vacuum cycle. A process can iteratively repeat the automatically changing operation of the robotic vacuum to the second operating mode, the measuring, the selecting the direction in which to navigate the robotic vacuum, the navigating the robotic vacuum in the selected direction, and the automatically changing the operation of the robotic vacuum from the second operating mode to the first operating mode.

Accordingly provided is navigation of a robotic vacuum based on a debris collection signature. In operation, the vacuum can intermittently increase the suction power of all of the suction ports (drawing debris from different directions), measure the debris collected along each of the suction directions, then route the robotic vacuum toward the direction from which the most debris was collected. Notably, this may be done without using any localization sensors/processing to figure out the direction, as the debris retrieved from the floor can provide a signal as to which area(s) were already covered by the robotic vacuum. This serves as an approximate localization strategy and therefore no other localization/mapping is needed. It is noted, however, that robotic vacuums with localization technology could incorporate these aspects in an alternative or in addition to using its localization technology, if desired.

In accordance with particular embodiments, relatively small weight sensors are used to measure the amounts of debris collected thought the different ports, and suitable weight sensors are relatively inexpensive compared to technology needed to support localization techniques.

Figure 2:
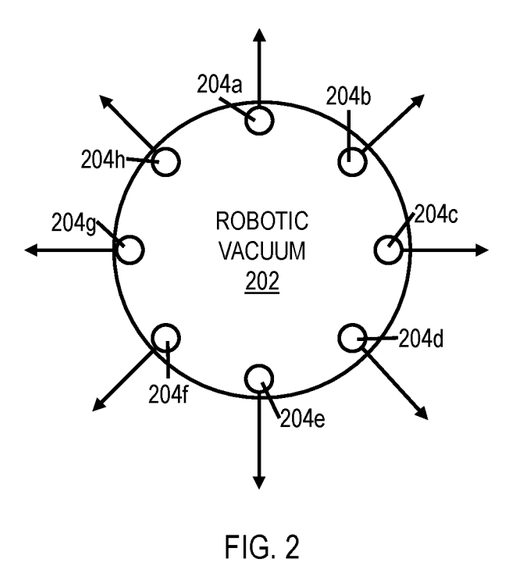
FIG. 2 depicts an example suction port arrangement on a robotic cleaning device, in accordance with aspects described herein.

FIG. 2 depicts an example suction port arrangement on a robotic cleaning device, in accordance with aspects described herein. In this example, the cleaning device is a robotic vacuum 202 that includes eight suction ports 204a-204h. The suction of each port could be generated using one or more suction component(s)/pump(s) (not pictured). The respective arrow extending from each port 204 indicates the suction path of the port. The suction path represents the general direction from which debris is pulled toward and into the robotic vacuum 102 through the corresponding port. The suction ports 204 are arranged around a periphery of the robotic vacuum 202 and the suction directions of the suction ports extend radially from the robotic vacuum. In this arrangement, debris originating from different directions is collected by the robotic vacuum. As previously noted, each suction port can have a respective varying suction power level that can be controlled programmatically.

The robotic vacuum 202 can incorporate one or more debris sensor(s) to measure an amount of debris collected through each suction port. While there may be any number of such sensors, it is noted that, in accordance with aspects herein, the amount of debris collected through each suction port individually is measured and there may be provided a respective debris sensor for each suction port.

Example debris sensors include (i) weight sensors that indicate the weight of debris, (ii) volume sensors that measure the amount as a volume or debris, and (iii) imaging device(s) that image the debris and leverage image recognition to measure the amount of debris collected.

Figure 3:
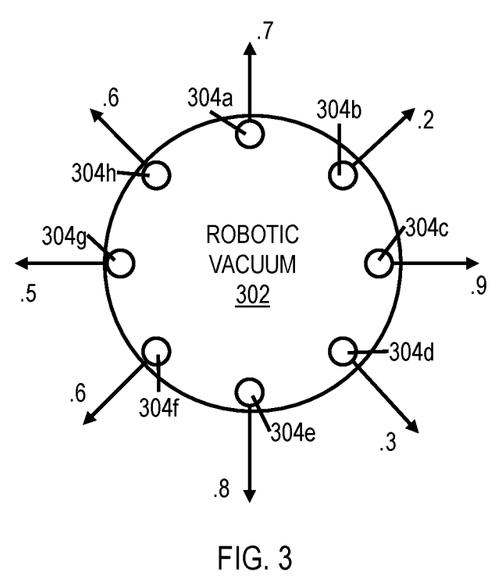
FIG. 3 depicts an example of directional debris measurement in accordance with aspects described herein.

FIG. 3 depicts an example of directional debris measurement in accordance with aspects described herein. Robotic vacuum 302 again includes eight suction ports 304a-304h. Here, the robotic vacuum was operated in a second operating mode (a relatively high suction power level) for a duration of time, for instance 20 seconds. Each suction port collects a respective amount of debris that is measured. The measurements are quantities that can be compared to each other.

In this example, the numbers are normalized to be between 0 and 1, where the higher the number, the greater the amount of debris that was collected.

One example second operating mode increases the suction power level (force) to the maximum force of which the robotic vacuum is capable. The robotic vacuum then measures, using a dedicated weight sensor for each suction port, the amount of debris collected through that suction port and quantifies that amount on a scale from 0 to 1. A 1 can indicate the highest amount of debris and 0 indicate the lowest amount of debris, though any scale or quantification approach could be used.

The port through which the greatest amount of debris was collected while the robotic vacuum operated in the second operating mode can indicate to the robotic vacuum or a control system providing control thereof in which direction to navigate the vacuum. It may be desired that the vacuum remain in a constant orientation in which it does not turn or spin when in the second operating mode. In one example, the vacuum remains stationary and does not twist or spin when in the second operating mode. In another example, the vacuum travels in straight line at a relatively slow speed and without spinning/turning.

Aspects described herein can be applied to robotic vacuums and other cleaning systems that do or do not include an intelligent navigation system that produces a map of the environment and navigates based on where it has visited on that map. In embodiments in which the vacuum incorporates such a navigation system, then the intermittent changing between the first and second operating modes to identify directions from which the greatest measured debris amounts were collected could be used to inform course corrections to the navigation system's separate mapping activity and/or instances where the vacuum should cover an area again on account that there was a significant enough amount of debris collected from an already-covered area (as informed by the debris collection in the second operating mode). If the cleaning device did not thoroughly clean a particular area, as evidenced from the debris amount measurements from operation in the second operating mode for instance, then the vacuum can detect this and determine to clean the area again.

Provided herein are approaches for intermittently increasing the suction power of the suction ports intaking debris from different directions in a robotic cleaning device, followed by measurement of the debris collected from each of the directions, then routing the robotic device toward the direction from which the greatest amount of debris was collected provides advantages. In some embodiments, no localization sensors are leveraged or used to figure out navigation direction, as instead the debris on the floor, specifically the amount collected from different directions relative to the robotic device during a vacuum/cleaning cycle, provides an indication of those areas more likely already cleaned/vacuumed by the robotic device than those less likely already cleaned/vacuumed, and therefore useful to direct navigation of the robotic vacuum. This in itself can be used as an approximated localization strategy for the robotic device. The debris measurements therefore provide approximated location tracking in which an amount of debris collected through a suction port is taken as an indication of a likelihood that the robotic vacuum has covered an area in a direction of the suction path of that suction port. A lower debris measurement, corresponding to a lower amount of debris collected during the time of operating in the second operating mode, indicates a higher likelihood (that the robotic vacuum has covered an area in a direction of the suction path) than does a higher debris measurement, corresponding to a higher amount of debris collected during the time of operating in the second operating mode. The approximated location tracking can then be used at least in part to track locations that the robotic vacuum has covered during the vacuum cycle, i.e. areas with relatively low and/or below a threshold amount of debris collected during a duration of time of operating in the second operating mode.

Notably, in some embodiments no localization sensors are required, which can be advantageous for cost reasons. Instead, relatively inexpensive (compared to existing localization techniques) small weight sensors can be used to measure the debris collected via each port.

Figure 4:
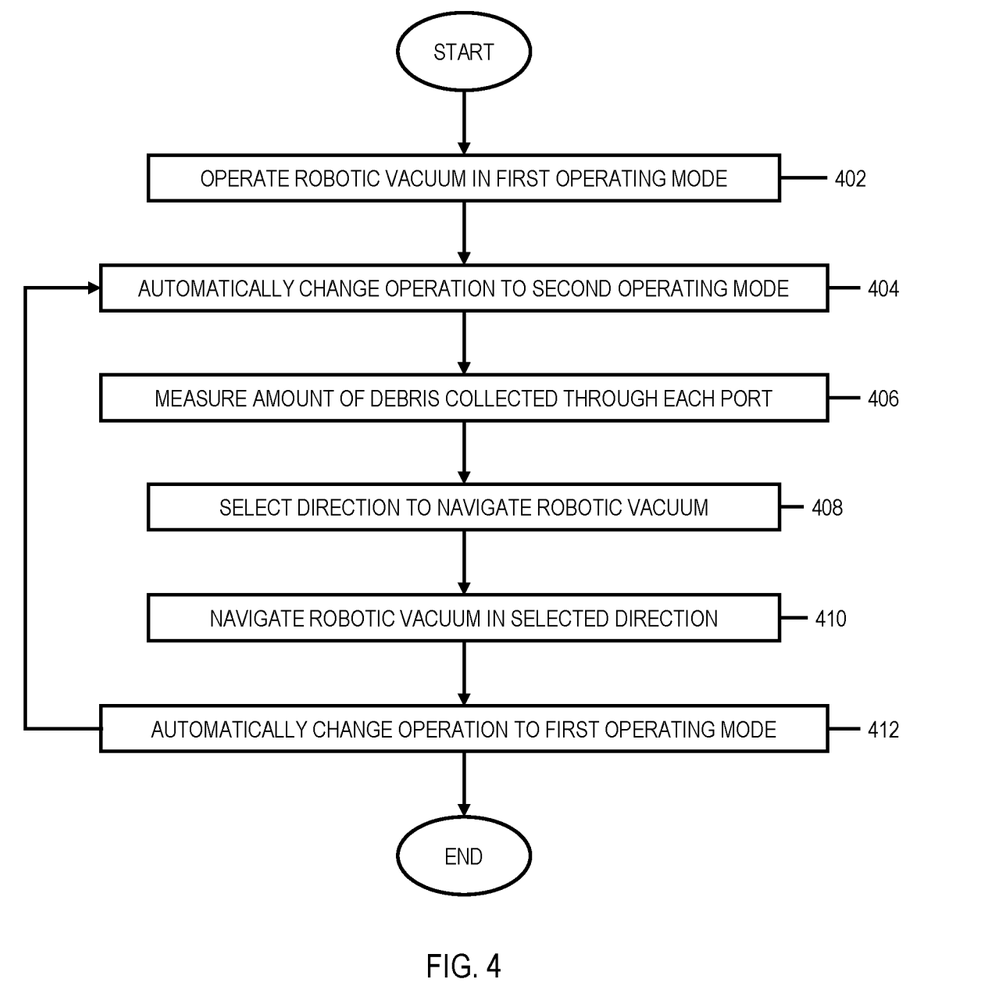
FIG. 4 depicts an example process for operating a robotic cleaning device, in accordance with aspects described herein.

FIG. 4 depicts an example process for operating a robotic cleaning device, in accordance with aspects described herein. In some examples, the process is performed by one or more computer systems, such as those described herein, which may include the robotic cleaning device itself and/or one or more control computer systems (controller(s)) of or connected to the robotic cleaning device, such as a local or remote (e.g. cloud) server and/or one or more other computer systems. Some or all aspects of the process of FIG. 4 could be performed by the robotic cleaning device itself, or some/all aspects could be performed by controller(s) in wireless communication with the robotic cleaning device. The robotic cleaning device can be or include a robotic vacuum in some embodiments.

The process includes operating (402) the robotic cleaning device in a first operating mode as part of a vacuum cycle. The robotic cleaning device includes a plurality of suction ports configurable for different suction power levels. Each suction port has a respective suction path along which debris entering the robotic cleaning device through the suction port is collected by the robotic cleaning device. The first operating mode includes operating the plurality of suction ports at a first suction power level.

In embodiments, the suction ports are arranged around a periphery of the robotic cleaning device and the suction directions of the suction ports extend radially from the robotic cleaning device. In embodiments, the first operating mode further includes operating the robotic cleaning device in a random-walk, in which the robotic cleaning device navigates without tracking the movement or location of the robotic cleaning device during the vacuum cycle.

The process continues with automatically changing (404) operation of the robotic cleaning device to a second operating mode and operating the robotic cleaning device in the second operating mode as part of the vacuum cycle. The second operating mode includes operating the plurality of suction ports at a second suction power that is greater than the first suction power. At the second (greater) suction power, a greater amount of suctional force is provided through each of the suction ports. The process measures (406), using one or more debris sensors, a respective amount of debris collected through each suction port of the plurality of suction ports. In embodiments, the amount measured is the about of debris collected during/as a result of operating in the second operational mode. The measuring (406) provides a plurality of debris measurements, i.e. one measurement corresponding to each suction port and specifically the amount of debris collected through that port over a duration of time. The duration of time can extend from when the plurality of suction ports begin operating at the second suction power level in the second operating mode until when the device changes into a different (e.g. back to the first) operating mode at a different suction power level.

In embodiments, the one or more debris sensors include a respective debris sensor for each suction port, i.e. dedicated to measuring the amount of debris collected through that power. In examples, the debris sensor(s) are weight sensors for each suction port and the measuring (406) includes measuring, using the weight sensor for a suction port, the weight of debris collected through that suction port. Additionally or alternatively, the one or more debris sensors include a volume sensor, and the measuring (406) measures the respective amount of debris collected through each suction port as a volume of the debris collected through that suction port. Additionally or alternatively, the one or more debris sensors can include an imaging device, and the measuring (406) measures the respective amount of debris collected through each suction port using image recognition to measure the amount of debris collected through that suction port.

The process continues by selecting (408) a direction in which to navigate the robotic vacuum based on the plurality of debris measurements. In embodiments, the selected direction is the direction corresponding to the suction path of the suction port through which the greatest amount of debris was gathered as measured. In the example of FIG. 3, the selected direction would be toward the right side of the figure, as the greatest measured amount was 0.9 in that example.

The plurality of debris measurements can provide approximated location tracking, where an amount of debris collected through a suction port is taken as an indication of a likelihood that the robotic vacuum has covered an area in a direction of the suction path of that suction port. A lower debris measurement (say measured for port 304*b* in the example of FIG. 3) indicates a higher likelihood that the robotic cleaning device has covered an area in the corresponding direction than does a higher debris measurement (say measured for port 304*c* in the example of FIG. 3, which indicates a lower likelihood that the robotic cleaning device has covered an area in the corresponding direction). The approximated location tracking can be used at least in part to track locations that the robotic vacuum has covered during the vacuum cycle and/or the relative level of cleaning provided in those areas.

The process continues by navigating (410) the robotic cleaning device in the selected direction. By navigating is meant that the operation of the robotic cleaning device directs the robotic cleaning device to travel in the selected direction.

At some point the process automatically changes (412) the operation of the robotic vacuum from the second operating mode to another operating mode, such as back to the first operating mode.

In this manner, navigation of the robotic cleaning device can be controlled to move the robotic cleaning device in a direction corresponding to an area from which the most debris was collected when operating in a selected (second) operating mode for a duration of time. The duration of time could be predetermined and fixed.

Aspects of FIG. 4 can repeat one or more times during a vacuum cycle. In FIG. 4, the process continues by returning back to 404 to repeat the automatically changing the operation of the robotic cleaning device to the second operating mode (404), the measuring (406), the selecting a direction in which to navigate the robotic cleaning device (408), the navigating the robotic cleaning device in that selected direction (410), and the automatically changing the operation of the robotic cleaning device from the second operating mode to the first operating mode (412).

In this manner, the operating mode of the robotic cleaning device is periodically or aperiodically to change the suction power level and take measurements based on the changed suction power level. In examples, this iteration occurs multiple times during the vacuum cycle, and potentially two or more times per minute.

Although various examples are provided, variations are possible without departing from a spirit of the claimed aspects.

Figure 5:
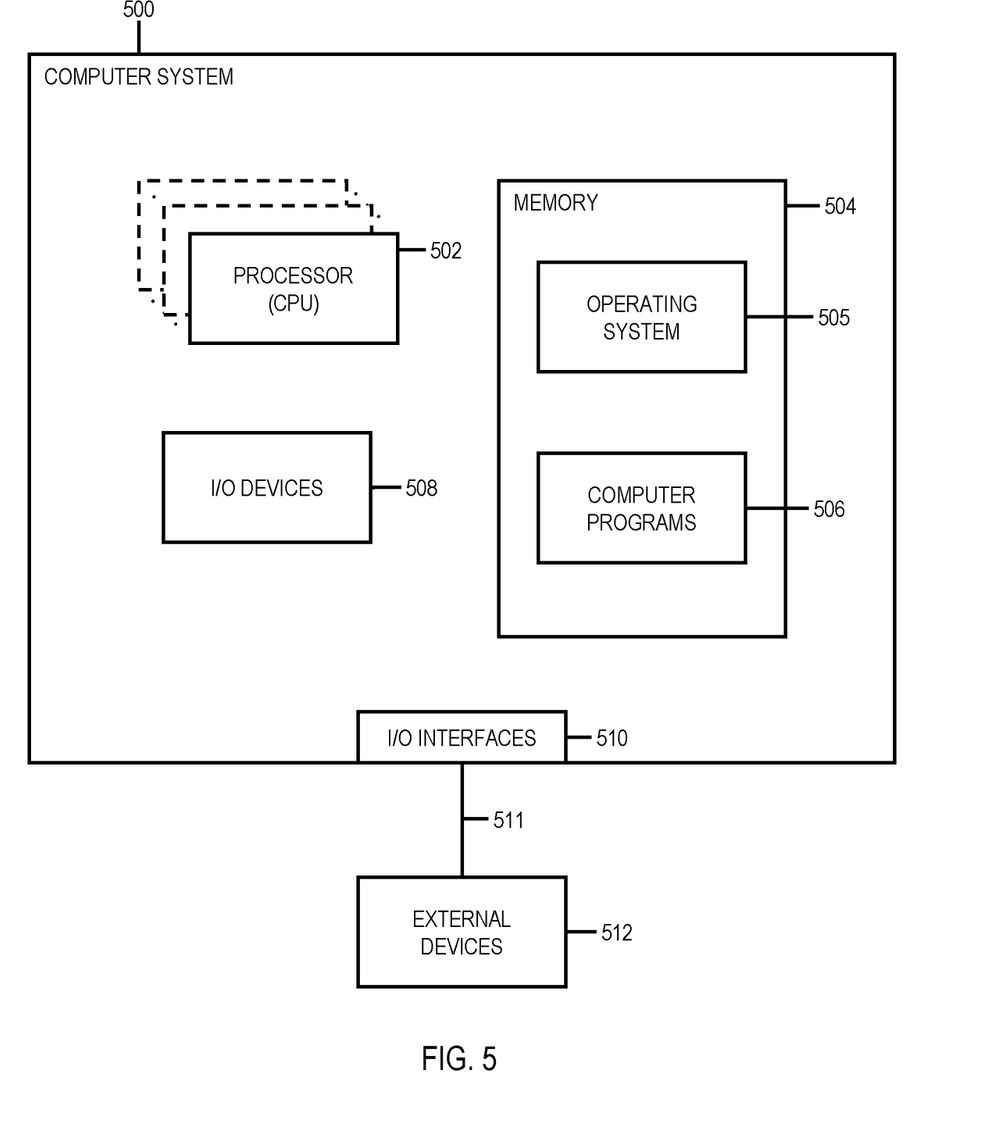
FIG. 5 depicts one example of a computer system and associated devices to incorporate and/or use aspects described herein.

Processes described herein may be performed singly or collectively by one or more computer systems, such as one or more robotic cleaning devices and/or one or more other computer systems in communication therewith, as examples. FIG. 5 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, New York, USA), Intel Corporation (Santa Clara, California, USA) or ARM Holdings plc (Cambridge, England, United Kingdom), as examples.

FIG. 5 shows a computer system 500 in communication with external device(s) 512. Computer system 500 includes one or more processor(s) 502, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 502 can also include register(s) to be used by one or more of the functional components. Computer system 500 also includes memory 504, input/output (I/O) devices 508, and I/O interfaces 510, which may be coupled to processor(s) 502 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 504 can be or include main or system memory (e.g. Random Access Memory) used in the execution of program instructions, storage device(s) such as hard drive(s), flash media, or optical media as examples, and/or cache memory, as examples. Memory 504 can include, for instance, a cache, such as a shared cache, which may be coupled to local caches (examples include L1 cache, L2 cache, etc.) of processor(s) 502. Additionally, memory 504 may be or include at least one computer program product having a set (e.g., at least one) of program modules, instructions, code or the like that is/are configured to carry out functions of embodiments described herein when executed by one or more processors.

Memory 504 can store an operating system 505 and other computer programs 506, such as one or more computer programs/applications that execute to perform aspects described herein. Specifically, programs/applications can include computer readable program instructions that may be configured to carry out functions of embodiments of aspects described herein.

Examples of I/O devices 508 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (512) coupled to the computer system through one or more I/O interfaces 510.

Computer system 500 may communicate with one or more external devices 512 via one or more I/O interfaces 510. Example external devices include a keyboard, a pointing device, a display, and/or any other devices that enable a user to interact with computer system 500. Other example external devices include any device that enables computer system 500 to communicate with one or more other computing systems or peripheral devices such as a printer. A network interface/adapter is an example I/O interface that enables computer system 500 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Washington, U.S.A.).

The communication between I/O interfaces 510 and external devices 512 can occur across wired and/or wireless communications link(s) 511, such as Ethernet-based wired or wireless connections. Example wireless connections include cellular, Wi-Fi, Bluetooth®, proximity-based, near-field, or other types of wireless connections. More generally, communications link(s) 511 may be any appropriate wireless and/or wired communication link(s) for communicating data.

Particular external device(s) 512 may include one or more data storage devices, which may store one or more programs, one or more computer readable program instructions, and/or data, etc. Computer system 500 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 500 may be operational with numerous other general purpose or special purpose computing system environments or configurations. Computer system 500 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
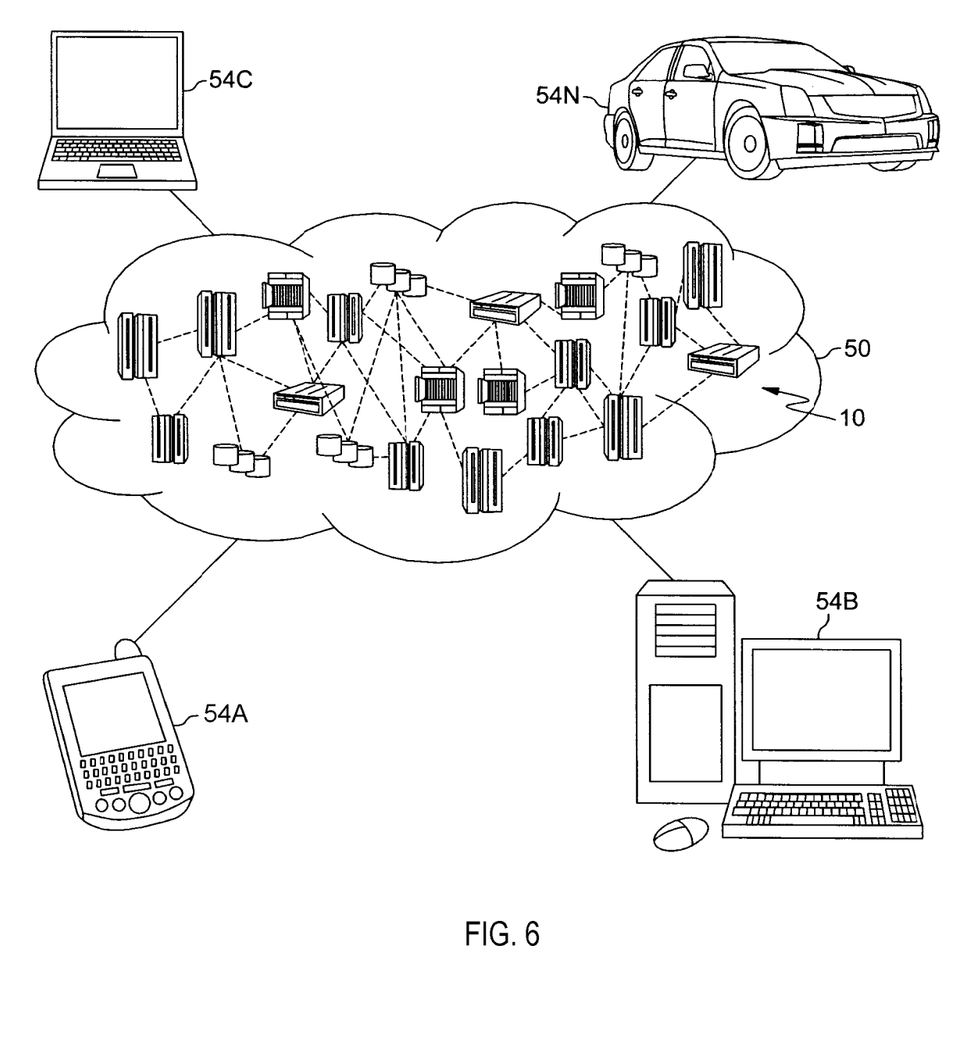
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
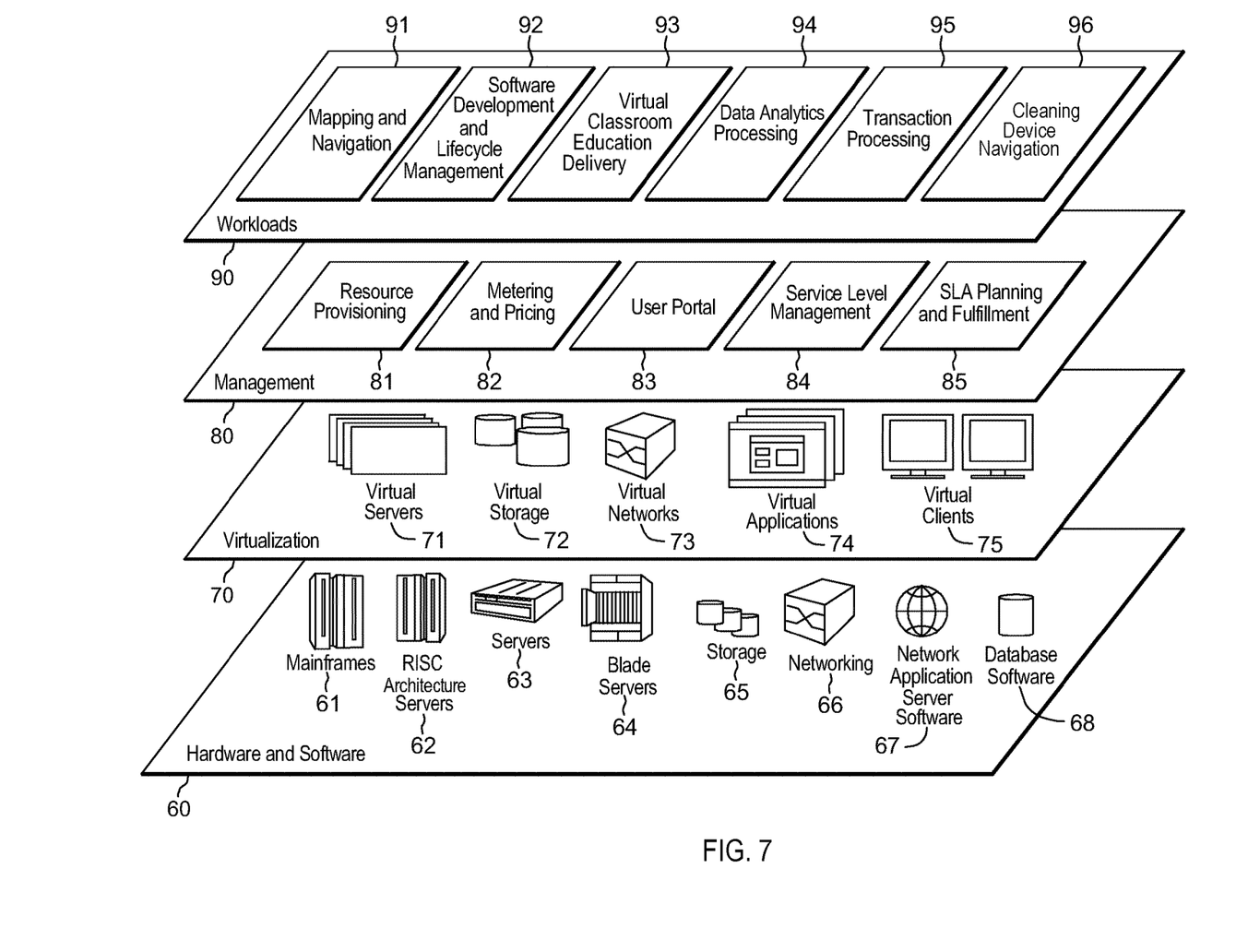
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cleaning device navigation 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
    operating a robotic cleaning device in a first operating mode as part of a vacuum cycle, the robotic cleaning device comprising eight suction ports configurable for different suction power levels, wherein a suction port comprises a respective suction path along which debris entering through the suction port is collected by the robotic cleaning device, wherein the eight suction ports are arranged in a fixed equidistant spacing in a periphery of the robotic cleaning device such that the respective suction path of the eight suction ports extend radially from a center of the robotic vacuum, wherein the first operating mode comprises operating the eight suction ports at a first suction power level;
    automatically changing operation of the robotic cleaning device to a second operating mode and operating the robotic cleaning device in the second operating mode as part of the vacuum cycle, wherein the second operating mode comprises operating the eight suction ports at a second suction power level greater than the first suction power level;
    measuring, during the second operating mode and using one or more debris sensors, a respective amount of debris collected through the eight suction ports, the measuring providing a plurality of debris measurements, wherein a dedicated debris sensor of the one or more debris sensors is provided for each of the eight suction ports and the amount of debris is measured individually for each respective suction port using the dedicated debris sensor;
    comparing the plurality of debris measurements collected using the dedicated debris sensor, thereby determining a suction port and respective suction path having a greatest amount of debris; and
    selecting a direction in which to navigate the robotic cleaning device based on the comparison of the plurality of debris measurements, wherein the selected direction is a direction corresponding to the suction path of the suction port through which the greatest amount of debris was collected.

2. The method of claim 1, further comprising navigating the robotic cleaning device in the selected direction and automatically changing the operation of the robotic cleaning device from the second operating mode to the first operating mode.

3. The method of claim 2, further comprising iterating:
    the automatically changing operation of the robotic cleaning device to the second operating mode;
    the measuring;
    the selecting a direction in which to navigate the robotic cleaning device;
    the navigating the robotic cleaning device in the selected direction; and
    the automatically changing the operation of the robotic cleaning device from the second operating mode to the first operating mode.

4. The method of claim 1, wherein the first operating mode further comprises operating the robotic cleaning device in a random-walk in which the robotic cleaning device navigates without tracking the movement or location of the robotic cleaning device during the vacuum cycle.

5. The method of claim 1, wherein the plurality of debris measurements provide approximated location tracking, wherein an amount of debris collected through a suction port is taken as an indication of a likelihood that the robotic cleaning device has covered an area in a direction of the suction path of that suction port, wherein a lower debris measurement indicates a higher likelihood than a higher debris measurement, and wherein the approximated location tracking is used at least in part to track locations that the robotic cleaning device has covered during the vacuum cycle.

6. The method of claim 1, wherein the one or more debris sensors comprises a respective weight sensor, wherein the measuring comprises measuring, using the weight sensor for a suction port, the weight of debris collected through that suction port.

7. The method of claim 1, wherein the one or more debris sensors comprises a volume sensor, and wherein the measuring measures the respective amount of debris collected as a volume of the debris collected through that suction port.

8. The method of claim 1, wherein the one or more debris sensors comprises an imaging device, and wherein the measuring measures the respective amount of debris collected using image recognition to measure the amount of debris collected through that suction port.

9. A system comprising:
    a processor; and
    a processor memory in communication with the processor, wherein the memory includes instructions for the system to perform a method comprising:
        operating a robotic cleaning device in a first operating mode as part of a vacuum cycle, the robotic cleaning device comprising eight suction ports configurable for different suction power levels, wherein a suction port comprises a respective suction path along which debris entering through the suction port is collected by the robotic cleaning device, wherein the eight suction ports are arranged in a fixed equidistant spacing in a periphery of the robotic cleaning device such that the respective suction path of the eight suction ports extend radially from a center of the robotic vacuum, wherein the first operating mode comprises operating the eight suction ports at a first suction power level;
        automatically changing operation of the robotic cleaning device to a second operating mode and operating the robotic cleaning device in the second operating mode as part of the vacuum cycle, wherein the second operating mode comprises operating the eight suction ports at a second suction power level greater than the first suction power level;

measuring, during the second operating mode and using one or more debris sensors, a respective amount of debris collected through the eight suction ports, the measuring providing a plurality of debris measurements, wherein a dedicated debris sensor of the one or more debris sensors is provided for each of the eight suction ports and the amount of debris is measured individually for each respective suction port using the dedicated debris sensor;

comparing the plurality of debris measurements collected using the dedicated debris sensor, thereby determining a suction port and respective suction path having a greatest amount of debris; and selecting a direction in which to navigate the robotic cleaning device based on the comparison of the plurality of debris measurements, wherein the selected direction is a direction corresponding to the suction path of the suction port through which the greatest amount of debris was collected.

10. The system of claim 9, wherein the system is the robotic cleaning device.

11. The system of claim 9, wherein the method further comprises navigating the robotic cleaning device in the selected direction, automatically changing the operation of the robotic cleaning device from the second operating mode to the first operating mode, and iterating:
the automatically changing operation of the robotic cleaning device to the second operating mode;
the measuring;
the selecting a direction in which to navigate the robotic cleaning device;
the navigating the robotic cleaning device in the selected direction; and
the automatically changing the operation of the robotic cleaning device from the second operating mode to the first operating mode.

12. The system of claim 9, wherein the first operating mode further comprises operating the robotic cleaning device in a random-walk in which the robotic cleaning device navigates without tracking the movement or location of the robotic cleaning device during the vacuum cycle.

13. The system of claim 9, wherein the plurality of debris measurements provide approximated location tracking, wherein an amount of debris collected through a suction port is taken as an indication of a likelihood that the robotic cleaning device has covered an area in a direction of the suction path of that suction port, wherein a lower debris measurement indicates a higher likelihood than a higher debris measurement, and wherein the approximated location tracking is used at least in part to track locations that the robotic cleaning device has covered during the vacuum cycle.

14. The system of claim 9, wherein the one or more debris sensors comprises a respective weight sensor, wherein the measuring comprises measuring, using the weight sensor for a suction port, the weight of debris collected through that suction port.

15. A computer program product comprising:
a computer readable storage medium readable by a processing circuit and storing instructions for execution by the processing circuit for performing a method comprising:
operating a robotic cleaning device in a first operating mode as part of a vacuum cycle, the robotic cleaning device comprising eight suction ports configurable for different suction power levels, wherein a suction port comprises a respective suction path along which debris entering through the suction port is collected by the robotic cleaning device, wherein the eight suction ports are arranged in a fixed equidistant spacing in a periphery of the robotic cleaning device such that the respective suction path of the suction ports extend radially from a center of the robotic vacuum, wherein the first operating mode comprises operating the eight suction ports at a first suction power level;

automatically changing operation of the robotic cleaning device to a second operating mode and operating the robotic cleaning device in the second operating mode as part of the vacuum cycle, wherein the second operating mode comprises operating the eight suction ports at a second suction power level greater than the first suction power level;

measuring, during the second operating mode and using one or more debris sensors, a respective amount of debris collected through the eight suction ports, the measuring providing a plurality of debris measurements, wherein a dedicated debris sensor of the one or more debris sensors is provided for each of the eight suction ports and the amount of debris is measured individually for each respective suction port using the dedicated debris sensor;

comparing the plurality of debris measurements collected using the dedicated debris sensor, thereby determining a suction port and respective suction path having a greatest amount of debris; and selecting a direction in which to navigate the robotic cleaning device based on the comparison of the plurality of debris measurements, wherein the selected direction is a direction corresponding to the suction path of the suction port through which the greatest amount of debris was collected.

16. The computer program product of claim 15, wherein the method further comprises navigating the robotic cleaning device in the selected direction, automatically changing the operation of the robotic cleaning device from the second operating mode to the first operating modem, and iterating:
the automatically changing operation of the robotic cleaning device to the second operating mode;
the measuring;
the selecting a direction in which to navigate the robotic cleaning device;
the navigating the robotic cleaning device in the selected direction; and
the automatically changing the operation of the robotic cleaning device from the second operating mode to the first operating mode.

17. The computer program product of claim 15, wherein the first operating mode further comprises operating the robotic cleaning device in a random-walk in which the robotic cleaning device navigates without tracking the movement or location of the robotic cleaning device during the vacuum cycle.

18. The computer program product system of claim 15, wherein the one or more debris sensors comprises a respective weight sensor, wherein the measuring comprises measuring, using the weight sensor for a suction port, the weight of debris collected through that suction port.

* * * * *